April 28, 1959
K. BOLLMANN
2,884,596
ELECTRICAL MEASURING INSTRUMENT
Filed Dec. 16, 1952
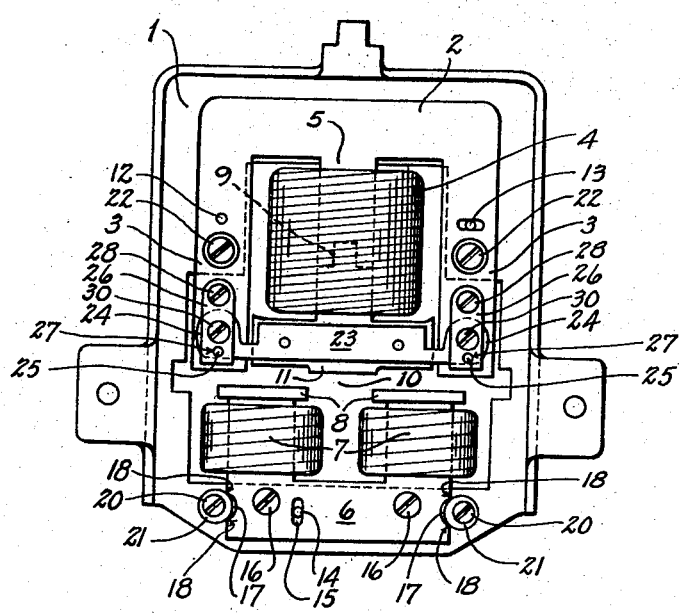
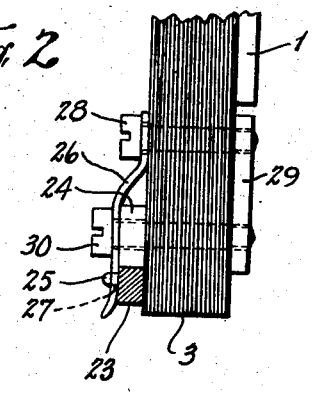
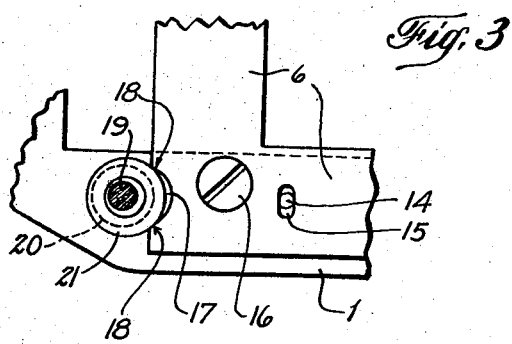
INVENTOR:
KARL BOLLMANN
BY Morgan, Finnegan & Durham
ATTORNEYS.

Patented Apr. 28, 1959

2,884,596
ELECTRICAL MEASURING INSTRUMENT

Karl Bollmann, Zurich, Switzerland, assignor to Landis & Gyr A.G., Zug, Switzerland, a body corporate Application December 16, 1952, Serial No. 326,302

Claims priority, application Switzerland December 21, 1951

2 Claims. (Cl. 324—137)

The present invention relates to a novel and improved electrical measuring instrument of the type having one or more electromagnets provided with an air gap in which a movable element is mounted for movement by the magnetic field.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a front view of a typical and illustrative embodiment of the invention, the cover, movable disc and certain other parts being omitted;

Figure 2 is an enlarged cross-sectional view of a portion of the voltage core shown in Figure 1; and Figure 3 is a fragmentary enlarged front elevation of certain of the current core parts shown in Figure 1.

In electrical measuring instruments such as electricity meters, an accurate adjustment of the air gap is necessary to vary the space between the operating cores in which the driven element moves. This air gap requires a definite and precise adjustment of the cores in relation to the position of the driven disc or other element, as well as a particular disposition of the cores (current and voltage magnetic circuits) relative to each other. It is also necessary to satisfy this requirement after temporary dismantling, such as may become necessary in the course of operation, for example, on the occurrence of a fault in a coil. Such requirement complicates and delays the reassembly, especially in regard to the exact calibration of the instrument.

The present invention has for its object the provision of a novel and improved construction of the core elements of an electrical metering instrument in which the cores and their supporting frame are mutually provided with engaging elements which provide for the precise location of the core elements with respect to each other, thereby accurately controlling the extent and exact position of the air gaps between the core elements, and permitting the instrument to be disassembled and reassembled without danger that the original accuracy of the adjustment may be lost, and without requiring that the instrument be carefully subjected to elaborate testing and recalibration. Still another object is the provision of a constructional form of an electrical metering instrument in which there are provided core elements which may be removed and readily replaced in their original location without the use of separate gauges or testing instruments.

The present invention also includes the provision of a special construction for securing the cores of the operating system of an electrical measuring instrument to the supporting framework in the interior of the instrument with interlocking means which provide the cores with a rough adjustment on the supporting framework along the central transverse plane of the system, and adjustable projecting means which provide for accurate adjustment of the cores with respect to the air gap between them. The whole is arranged in such a manner that after mounting of the cores on the framework by the interlocking means the original adjustment of the air gap may be reestablished and the cores may be firmly secured to the framework, as by screws. After dismantling of the cores or of parts of the cores the parts are easily and rapidly reassembled to ensure the original adjusted position to the formerly dismantled parts.

It will be understood that the foregoing general description and the following detailed description as well are exemplary and explanatory of the invention but are not restrictive thereof.

Referring now in detail to the present preferred and illustrative form of the invention shown in the accompanying drawings as applied to a watt-hour meter of the Ferraris type, there is provided a supporting framework 1 on the inside of an alternating current electricity meter. The voltage core 2 of the operating system has side legs 3 and a central leg 5 carrying the voltage coil 4. The current core 6 of the system, which carries current coils 7, has pole pieces 8. The central leg 5, divided at 9, terminates opposite the air gap 10 in a pole piece 11. A driving disc (not shown) rotates in the air gap 10.

The arrangement is shown in the drawing in the assembled condition and is similarly described.

Interlocking means 12 and 13 are provided on the side legs 3 of the voltage core 2 and on the framework 1. Interlocking means 12 consist of pin and hole connecting means and the interlocking means 13 consist of horizontally extending pin and slot connecting means. The pins are illustratively, firmly secured in the framework 1 and the hole or slot respectively provided in the registering leg 3 of the voltage core.

Interlocking means 14, 15 are also provided between the current core 6 and the framework 1. A pin 14 is illustratively, firmly secured in the framework 1 and a vertically extending slot 15 is provided in the current core 6.

The current core 6 is secured to the framework 1 by screws 16 serving in the usual manner, the shanks of these screws extending loosely through holes in the current core 6, to permit the adjustment of this core relative to the air gap 10. On the outer edges of the current core 6 are lips 18 formed by means of concave depressions 17. Screws having shanks 19 and heads 20 are screwed into the framework near the points on the framework 1 at which the depressions 17 lie on assembly of the driving system on the framework. Discs 21 are arranged on the shanks 19 of these screws with considerable play and overlap the heads 20 of the screws (shown in Figure 3). By means of these locking screws 19, 20 the discs 21 as a result of their play on the shanks of the screws can lie against the lips 18 of the current core 6, and can be precisely located on the framework 1 by tightening of said screws.

The voltage core 2 is secured to the framework 1 similarly to the case of the current core 6, by screws 22 which pass through the legs 3 of the core with play to allow adjustment of the voltage core on the framework 1 and consequent adjustment of the air gap 10.

A cross-member 23 is firmly secured to the voltage pole piece 11. The ends 24 of the cross-piece 23 engage the legs 3 and each have an interlocking element in the form of a pin 25, while leaf springs 26 have interlocking elements in the form of holes 27. The leaf springs 26 are bent and lie with their upper ends remote from the holes 27 and against the legs 3. At these points screws 28 extend with play through the springs 26, pass through the legs 3, and are screwed into fish plates 29 which are on the side of the legs 3 opposite to the springs 26. The outwardly bent portions of springs 26 engage and lie over the ends 24 of the cross-member 23 as the interlocking means 25, 27 engage one another. Securing screws 30 which extend with play through the springs 26 and the ends 24 of the cross-member, pass through the legs 3 and are screwed into the fish plate 29.

The condition described corresponds to the working or assembled condition. In this condition, the pole piece 11 after mounting of the voltage coil 4 on the upper part of the central leg 5 was adjusted to attain complete junction at the engaging point 9, and, was located by means of the screws 28 and 30 and by the interlocking means 25 and 27 on the core 2, finally being secured to the legs 3 by the screws 28, 30. The voltage core 2, 3, 5, 11 thus formed as a unit with its voltage coil 4 was mounted on the framework 1 during assembly primarily by means of the interlocking means 12, 13 and firmly located in relation to the air gap 10 of the meter, the pin and slot interlocking means 13 completely preventing any small alterations of relative position between the framework 1 and the voltage core 2 during assembly. During original assembly tightening the screws 22 secured the entire structure to the framework 1. Furthermore, in the assembled condition rough adjustment of the current core 6 in the central transverse plane of the driving system would be effected by loosening of the screws 16 and 20 and with the cooperation of the interlocking means 14, 15, so that by means of an air gap gauge of known type the current core 6 can be accurately adjusted to the air gap and secured to the framework 1 by the screws 16.

The discs 21 were then placed against the lips 18 of the current core 6 and secured in this position by tightening of the screws 20.

The original adjustment of the core parts relative to the air gap was thus effected during assembly. Should dismantling of the instrument during the course of operation become necessary, for replacement of a defective coil or otherwise, the current core 6 can be removed from the apparatus after loosening and extraction of the screws 16. On re-assembly of the current core 6 the lips 18 and discs 21, which latter remain unaltered on the framework 1, give the current core an exact guide in relation to the framework 1, so that the current core 6 on being re-secured to the framework by the screws 16, comes positively into the position in which it was originally adjusted on initial assembly, the air gap 10 thereby preserving its originally adjusted dimensions without further manipulation.

If a dismantling of the voltage core 2, 3, 5, 11 be required, for example in order to change the voltage coil 4, then the voltage core 2, 3, 5, 11 is freed from the framework 1 by slackening of the screws 22 and is taken out of the instrument. The securing screws 30 are then removed and the interlocking means are unlatched by disengagement of the holes 27 in the springs 26, whereupon the pole piece 11 with its cross-member 23 can be removed from the remaining parts of the voltage core 2, 3, 5. After mounting the new voltage coil on one or other part of the central leg of the voltage core, the pole piece 11 with the ends 24 of the cross-member under the springs 26 which together with the fish plates then form an open clamp, is adjusted until the interlocking means 25, 27 snap into engagement and the pole piece 11 thus comes positively into the position originally adjusted on first assembly relatively to the part 2, 3, 5 of the voltage core. By tightening of the securing screws 30 and the consequent closing of the clamp 26, 29 the pole piece 11 is then secured in position relatively to the other parts of the voltage core. The entire voltage core is then held against the framework 1 by means of the interlocking means 12, 13 and is firmly screwed thereto again by the screws 22. By this arrangement the interlocking means 12, 13 positively position the voltage core in the former position in the apparatus, so that the originally adjusted position of the gap is obtained without further difficulty.

The invention in its broader aspects is not limited to the specific mechanisms shown and described but departures may be made therefrom within the scope of the accompanying claims without departing from the principles of the invention and without sacrificing its chief advantages.

What is claimed is:

1. In a watt hour meter wherein a frame removably supports a voltage core piece and a current core piece separated by an air gap which must be of precise dimensions, that improvement which comprises securing means in the form of screws passing through oversize holes in said core pieces and securing them to said frame, interlocking pin and aperture means operative between each of said core pieces and said frame independent of said securing means, at least one of said core pieces being provided with a pair of fixed locating surfaces, and a pair of adjustable elements carried by the frame and co-operating with said locating surfaces to relocate said core pieces after disassembly whereby the core pieces may be disassembled and reassembled without altering the precise dimensions of said air gap.

2. A meter as set forth in claim 1, wherein said voltage core piece includes two elements one of which is a cross member located with respect to the rest of the voltage core by interlocking locating means.

References Cited in the file of this patent

UNITED STATES PATENTS

| | | |
|---|---|---|
| 619,733 | Duncan | Feb. 21, 1899 |
| 1,181,207 | Bradshaw | May 2, 1916 |
| 1,479,698 | Choppinet | Jan. 1, 1924 |
| 1,739,166 | Moos | Dec. 10, 1929 |
| 1,755,110 | Frohlich | Apr. 15, 1930 |
| 1,835,750 | Beusch | Dec. 8, 1931 |
| 1,835,861 | Gartnas | Dec. 8, 1931 |
| 2,200,104 | Sonnemann | May 7, 1940 |
| 2,206,887 | Green | July 9, 1940 |